United States Patent [19]

Surakka et al.

[11] 4,067,814

[45] Jan. 10, 1978

[54] HYDROCYCLONE

[75] Inventors: Jorma Surakka; Matti Lankinen, both of Savonlinna, Finland

[73] Assignee: Enso-Gutzeit Osakeyhtio, Helsinki, Finland

[21] Appl. No.: 735,094

[22] Filed: Oct. 22, 1976

[30] Foreign Application Priority Data

Oct. 30, 1975 Finland ................................. 753027

[51] Int. Cl.² ............................................. B01D 21/26

[52] U.S. Cl. ............................ 210/512 R; 55/459 C; 209/211

[58] Field of Search ................. 55/419, 459 R, 459 A, 55/459 B, 459 C; 209/144, 211; 210/84, 512 R, 512 M

[56] References Cited

U.S. PATENT DOCUMENTS

| | | | |
|---|---|---|---|
| 2,616,563 | 11/1952 | Hebb | 55/459 R X |
| 2,796,808 | 6/1957 | Scott | 210/512 R X |
| 3,034,647 | 5/1962 | Giesse | 210/512 R X |
| 3,396,511 | 8/1968 | Fracke et al. | 210/512 R X |
| 3,507,397 | 4/1970 | Robinson | 209/211 X |
| 3,568,837 | 3/1971 | Laval, Jr. | 210/512 R X |
| 3,802,164 | 4/1974 | Bowen | 55/459 A X |

FOREIGN PATENT DOCUMENTS

| | | | |
|---|---|---|---|
| 632,603 | 7/1936 | Germany | 209/211 |
| 810,142 | 8/1951 | Germany | 209/211 |
| 14,428 of | 1913 | United Kingdom | 209/211 |

*Primary Examiner*—Thomas G. Wyse
*Assistant Examiner*—Robert H. Spitzer
*Attorney, Agent, or Firm*—Lewis H. Eslinger

[57] ABSTRACT

A hydrocyclone for the separation of a liquid suspension into accept and reject fractions, having a conically converging classification pipe, at the apex of which there is an opening for the reject fraction, and a base part in which there is an axial pipe for the accept fraction, and a minimum of two feed channels for the liquid suspension to be purified, in which the feed channel directs the liquid suspension onto an incline in the circular space between the classification pipe and the accept fraction outlet pipe, and the liquid suspension spray discharges from the incline over the spray in the following feed channel.

8 Claims, 6 Drawing Figures

HYDROCYCLONE

BACKGROUND OF THE INVENTION

The present invention relates to a hydrocyclone adapted for the purification of liquid suspensions.

In the paper and pulp industry such a hydrocyclone has a wide range of uses for removing coarse and fine impurities and dirt particles from fiber-pulp water suspensions. Hydrocyclones are advantageous to use because they have no mechanically moving parts, they are relatively simple, their purification efficiency is high, and they have a long life.

A modern hydrocyclone comprises a relatively long conical tank, the widest part, i.e., base, of which is located at the top. In this part is located the liquid suspension inlet, which is tangential to the mantle surface of the cone. The suspension to be treated is introduced into the cyclone at a high velocity and is forced to revolve rapidly, whereby a vertical liquid vortex the shape of an inverted cone is produced which simultaneously gravitates continuously downwards. Dirt and, in general, parts heavier than water are pushed outwards by the centrifugal force towards the layer at the periphery and concentrate there. Owing to the conical shape of the cyclone the revolving liquid layer moves rapidly towards the apex of the cone and the bulk of the impurities separated from the suspension, i.e., the reject fraction, withdraws through the outlet at the apex of the cone. The purified liquid accumulates in the less mobile core of the revolving pillar, and an upward flow is produced in it towards the second outlet, which is a coaxial pipe which has been introduced through the upper end of the cyclone and extends over some distance into the base of the cyclone. The accept fraction is removed through this pipe.

In the paper and pulp industry, very great fiber suspension quantities are often involved which pass through the system within a time unit. Since hydrocyclones cannot be constructed very large, as their purification efficiency would thereby lower, suitably dimensioned cyclones are used side by side in batteries.

The use of batteries has proven effective and reliable. They have, however, certain drawbacks. Each individual cyclone is of a somewhat unsuitable shape in terms of coupling because it has two concentric outlets and a tangential inlet, which in practice are usually coupled with tubes and tube couplings. This results, however, in great losses of pressure. In addition, the cyclone system becomes relatively space-consuming.

From Swedish Pat. No. 315,266 is previously known a construction intended to eliminate the above drawbacks. It is characterized in that at the base of the hydrocyclone, between the cyclone mantle and the outlet pipe for the accept fraction, there are obliquely positioned plates, and the feed flow is introduced into the hydrocyclone tangentially through the clearance between the plates. Thus a tangential component is produced in the flow fed into the cyclone, and it aids the revolving of the liquid pillar inside the hydrocyclone. According to the said patent, openings in the walls of the hydrocyclone base can also be used for the tangential feeding (FIGS. 4, 4*a* and 5, 5*a*). In the latter case the flows which are fed impinge against each other since they are not directed at different vertical levels. This, again, results in excess turbulences causing a lowered hydrocyclone capacity. In the former case the feed flows arrive at different vertical levels so that the impinging of the feed flows against each other is avoided. In terms of flow technology, however, the presented method is not the best possible since the clearances between the plates cannot guide the sprays but the sprays are discharged in an indefinite direction.

Finnish Pat. No. 42,912 introduces a hydrocyclone with a screw-like end plate at the base. This has, however, only one feed inlet, which means increased instablity in the flow. Furthermore, one inlet requires a long guiding channel in comparison with a multi-inlet solution. This tends to increase the size of the apparatus. When one feed inlet is used the sprays do not impinge against each other so that in such a case the screw surface is only a guiding surface.

The object of the present invention is to provide a hydrocyclone with stable operation, in which the sprays discharging inside the classification pipe are prevented from impinging against each other

SUMMARY OF THE INVENTION

According to the present invention there is provided a hydrocyclone in which feed channels lead onto inclines which direct the sprays to their own spiral paths interspaced in the classification pipe. When feed channels designed in a suitable manner so as to achieve preclassification in the suspension being fed are used for feeding the suspension into the hydrocyclone, the capacity of the hydrocyclone increases considerably.

DESCRIPTION OF THE PREFERRED EMBODIMENTS

Figure 1:
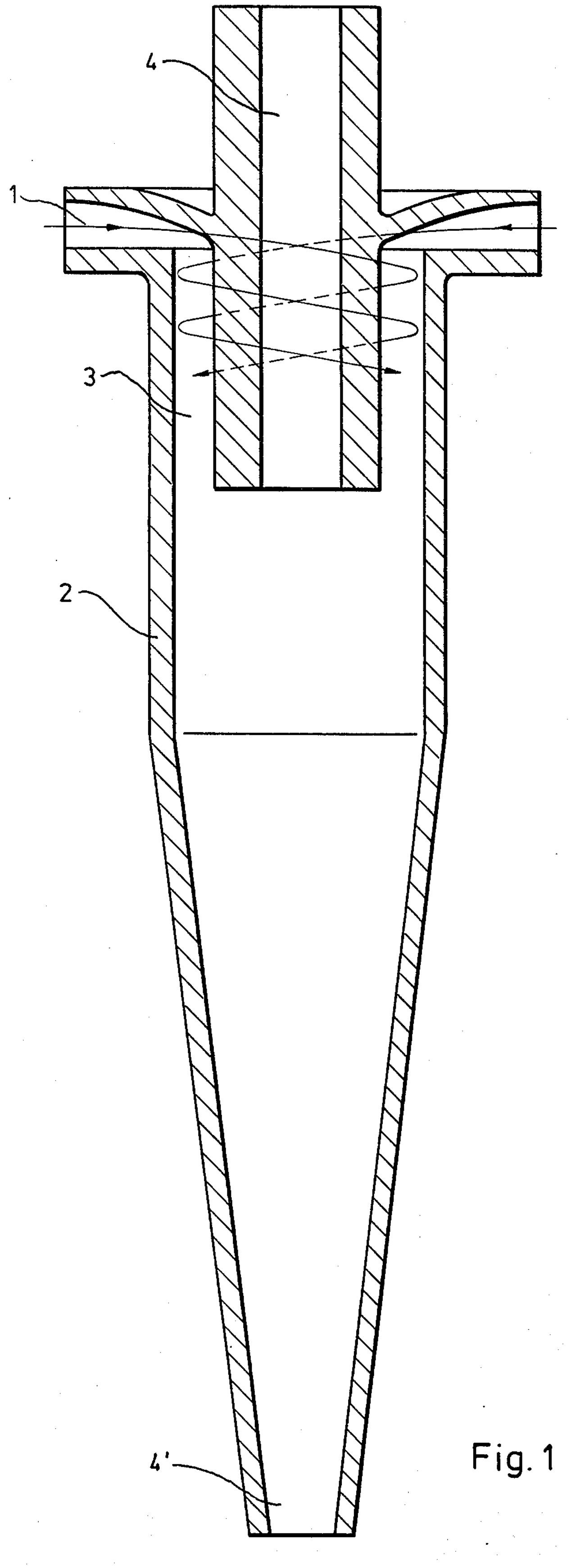
FIG. 1 shows a longitudinal cross section of a hydrocyclone according to the invention.

The hydrocyclone shown in FIG. 1 comprises in a known manner a classification pipe 2 which converges conically towards a reject fraction outlet 4', and an accept fraction outlet pipe 4 which extends in the base of the hydrocyclone over some distance into the classification pipe 2 so that a circular space 3 is formed between the inner wall of the classification pipe 2 and the outer wall of the outlet pipe 4; the liquid flows from the hydrocyclone feed channels 1 are directed into this space 3, whereby the liquid spray from each feed channel 1 discharges at its own point in the classification pipe 2, as indicated by arrows in FIG. 1. Thus several sprays are obtained (a number equal to the feed channels) which are interspaced already in the upper part of the classification pipe 2, and the impinging of the sprays against each other is prevented.

Figure 2:
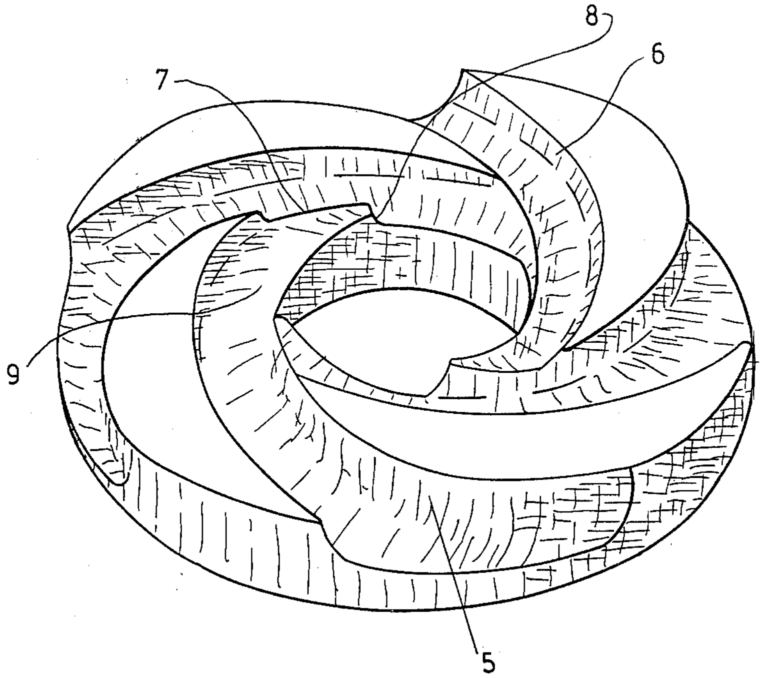
FIG. 2 shows a perspective view from the inside of the end plate of the base.
Figure 3:
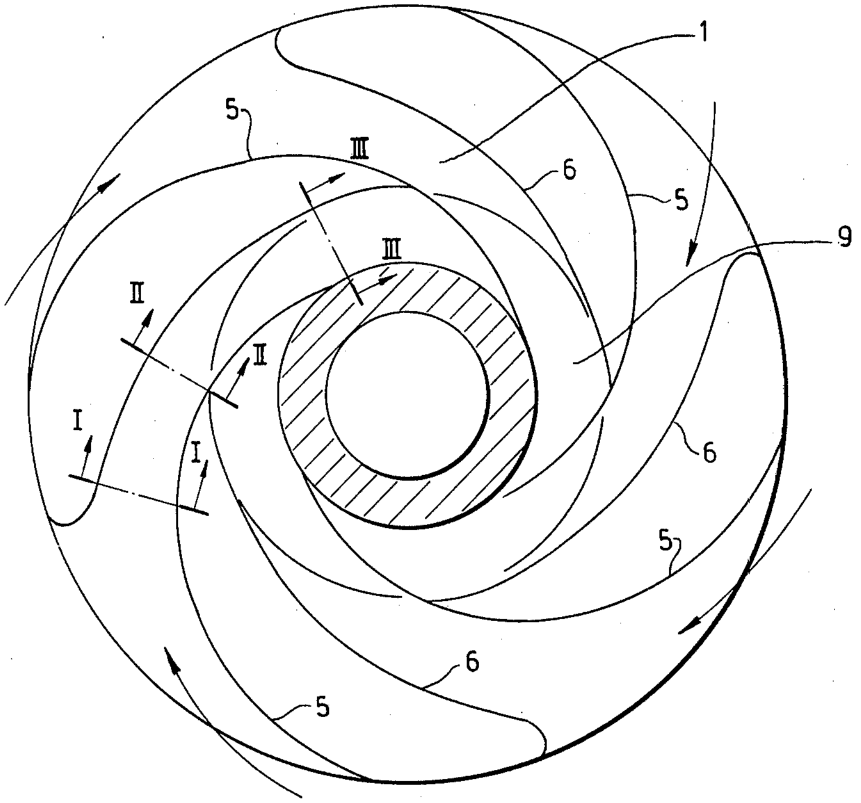
FIG. 3 shows a top view of the end plate of FIG. 2.
Figure 4:
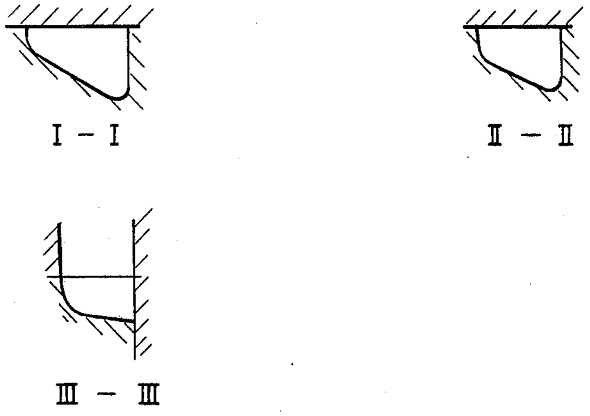
FIG. 4 shows cross sections of the channels along line I—I, II—II, and III—III in FIG. 3.

According to the invention this is achieved by using in the upper part of the classification pipe 2 an end plate shown in FIGS. 2 and 3. In FIG. 1 the feeding member has been depicted as a fixed part of the hydrocyclone, but in practice the feeding member consists of a circular plate of even thickness according to FIG. 2; in the middle of the plate there is an opening for the accept fraction outlet pipe 4. Some material has been removed from the plate, e.g., reinforced plastic, to form the feed channels 1. The feed channels 1 are grooves whose inner edges 5, as seen in the direction of the liquid suspension flow, curve inwards spirally and finally join the outer mantle of the outlet pipe 4 almost tangentially. The outer edges 6, as seen in the flow direction, for their part turn inwards spirally along a somewhat wider path and finally join the inner mantle of the classification pipe 2 almost tangentially. Thus a feeding channel is formed which has a relatively wide beginning but converges towards the end according to FIG. 2.

Figure 5:
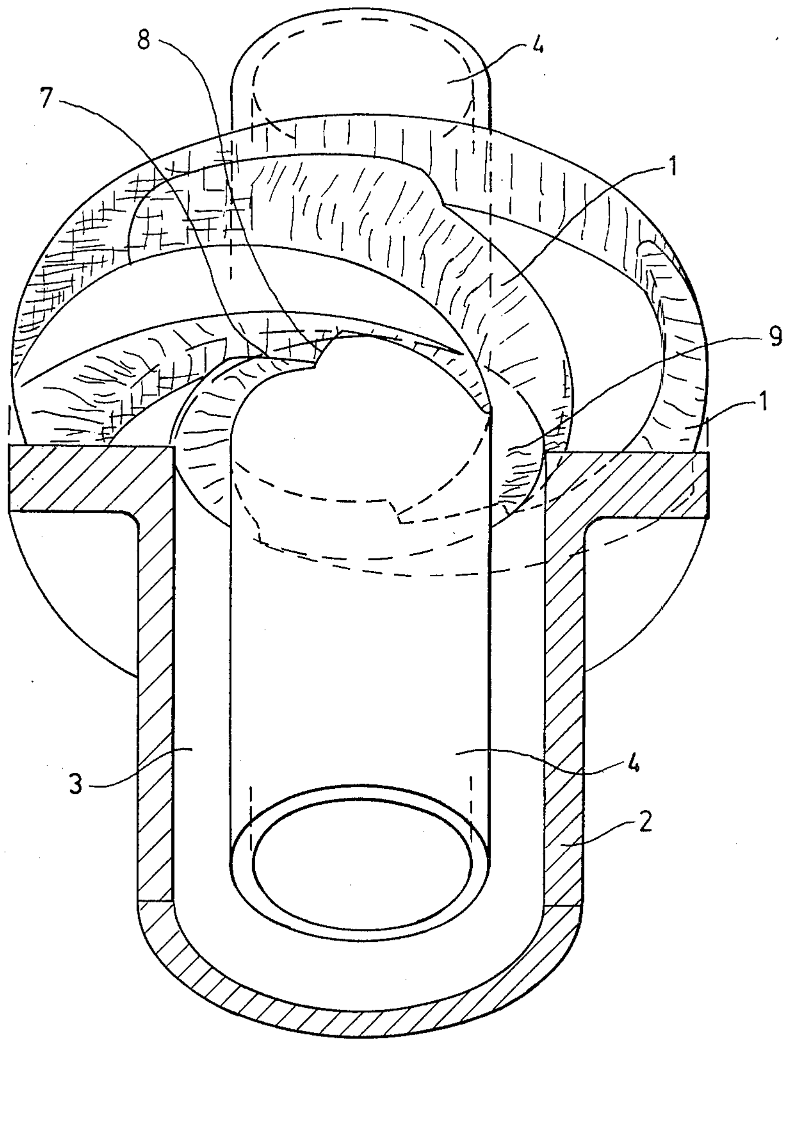
FIG. 5 shows a perspective view of the end plate placed in the hydrocyclone base, which is partly shown as a cross section.

The shape of the cross section of the feed channel 1 changes in accordance with FIG. 5 when moving inwards. At point 1, i.e., at the mouth of the feed channel, the bottom of the channel rises relatively sharply from the inner edge 5 towards the outer edge 6 and joins it without a sharp angle which could collect heavier parts separated from the suspension. When proceeding inwards in the channel, the bottom of the channel changes from inclined (point 1) to almost horizontal (point 3). This feed channel shape has an advantage in that from the fed liquid suspension which contains both heavier and lighter particles (sand grains, metal particles, etc., and fibers) the heavier particles are separated to the outer edge of the channel already at the beginning of the channel and owing to the centrifugal force they also remain there when the spray discharges into the classification pipe 2. Such a pre-classification of the suspension to be purified in a hydrocyclone increases the purification efficiency of the hydrocyclone.

The bottom of the feed channel 1 is inclined in the flow direction in such a manner that the spray discharging from each feed channel 1 over the edge 7 rises clockwise over the outer edge 6 of the following channel, whereby the impinging of the sprays against each other is prevented. The height of the incline 9 ending at the discharge point 7 is dimensioned so that it corresponds to the rise of the spiral path of a spray discharged from the channel 1, divided by the number of the inclines.

FIG. 5 shows a plate according to FIGS. 2 and 3, placed in the base part of the hydrocyclone. In this embodiment the feed channel 1 starts outside the classification pipe 2 and continues spirally inside the hydrocyclone. The liquid spray emerging from the feed channel 1 discharges onto the incline 9 in the circular space 3 between the classification pipe 2 and the accept fraction outlet pipe 4. As the outer edge of the feed channel 1 joins the inner edge of the classification pipe 2 almost tangentially, the vortex which removes impurities from the suspension begins in the circular space 3 with a maximal freedom from disturbances. The inner edge of the feed channel 1 again joins almost tangentially the outer edge of the accept fraction outlet pipe 4.

Thus the particles already "preclassified" in the feed channel 1 are directed in suspension already at the initial stage to the outer and inner parts of the produced vortex.

The sprays discharging from the different feed channels are prevented from impinging against each other by means of inclines which guide the sprays onto interspaced spiral paths. The vertical wall of the incline is curved and it extends from the inner wall of the classification pipe to the outer wall of the accept fraction in the circular space 3. From each incline the spray discharges obliquely over the liquid flowing in the following feed channel and tangentially meets the inner wall of the classification pipe, along which the spray moves spirally. The inclines thus give the sprays velocity components so directed that the spray discharged from a feed channel is no longer at the level of the discharging point after it has revolved 360° in the classification pipe. Thus the inclines prevent the sprays from impinging against themselves, which would cause turbulences and a decrease in the capacity.

Figure 6:
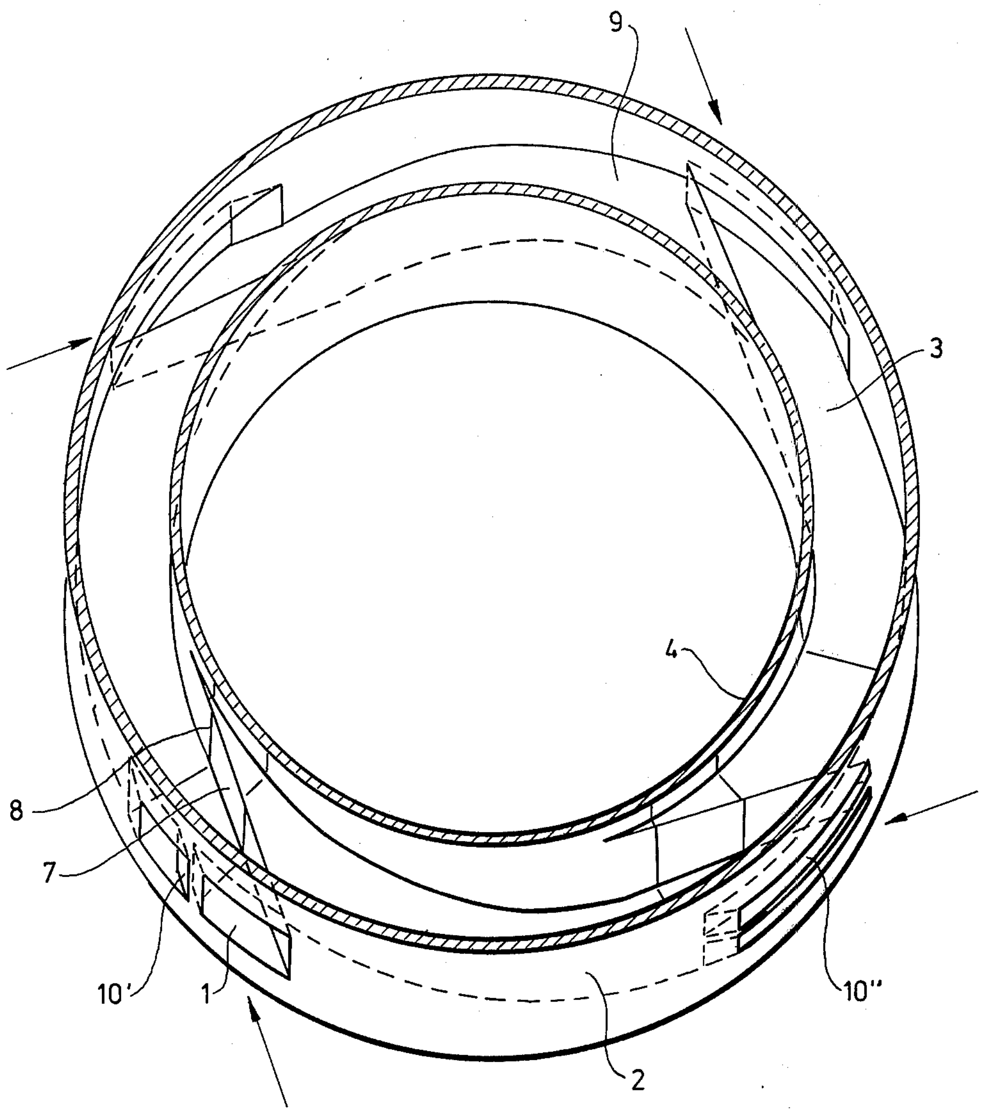
FIG. 6 shows a cross section of a hydrocyclone base according to another embodiment of the invention.

FIG. 6 shows another embodiment of the invention. In this case the feed channel 1 consists of an opening in the wall of the classification pipe 2; the opening is preferably rectangular in accordance with the figure. The opening has been made oblique in the wall of the classification pipe 2 so that the inner wall of the opening, as seen in the flow direction, joins the vertical wall 8 of the incline 9. Thus the flow to be directed into the channel is guided in the circular space 3 tangentially to the accept fraction outlet pipe 4. From the incline 9 of the feed channel 2 the sprays are guided in the manner described above over the spray moving in the following channel.

In the embodiment according to FIG. 6 the openings of the feed channel 1 can be divided into two or more parts by means of either a vertical partition wall 10' or horizontal partition walls 10".

The number of channels indicated in the figures is 4. It is self-evident, however, that the number of channels and the number of partition walls used in them can be varied, and thus the invention is not limited to the embodiments illustrated in the figures but can be varied within the claims.

What is claimed is:

1. A hydrocylcone for the separation of a liquid suspension into accept and reject fractions, comprising a conically converging classification pipe having an apex and a base, with said apex including an outlet opening therein through which the reject fraction of the suspension is discharged and said base having an axial outlet pipe mounted therein in spaced axial alignment with said outlet opening through which the accept fraction of the suspension is discharged; said outlet pipe and classification pipe defining therebetween a circular space; and suspension distribution means on said classification pipe for distributing said suspension into the circular space, said suspension distribution means having at least two generally axially shaped channels formed therein for feeding the liquid suspension into said circular space between the classification pipe and the accept fraction outlet pipe, said feed channels having first and second end portions with said second end portions being located adjacent said accept fraction outlet pipe in arcuately spaced relation to each other on substantially the same plane; said channels being inclined in relation to each other from said first end portion thereof toward said second end portions, which second end portions are located closer to said apex than said first end portions, whereby liquid suspension spray from said feed channels is discharged into said circular space along a separate spiral path from each of said channels respectively directed from said channels towards said apex whereby said spiral spray paths overlap and intermesh without intersecting so that spray from one channel is discharged into and moves in said circular space over the spray from the next adjacent feed channel.

2. A hydrocyclone according to claim 1, in which the feed channels begin outside the classification pipe and turn spirally into the circular space.

3. A hydrocyclone according to claim 1, in which the cross section of the feed channel is at least partly triangular.

4. A hydrocyclone according to claim 3, characterized in that the feed channel is divided by means of a vertical partition wall.

5. A hydrocyclone according to claim 3, characterized in that the feed channel is divided by means of a horizontal partition wall.

6. A hydrocyclone according to claim 1, in which the feed channels each have an inner wall, as seen in the flow direction, tangential to the accept fraction outlet pipe and an outer wall, as seen in the flow direction, parallel to the inner wall.

7. A hydrocyclone according to claim 1, in which the incline terminates in a vertical wall which is almost tangential to the accept fraction outlet pipe.

8. A hydrocyclone according to claim 7, in which the height of the vertical wall approximately equals the rise of the spiral path of the suspension in the circular space, divided by the number of inclines.

* * * * *